US008225109B1

(12) United States Patent
Kalligudd

(10) Patent No.: US 8,225,109 B1
(45) Date of Patent: Jul. 17, 2012

(54) METHOD AND APPARATUS FOR GENERATING A COMPRESSED AND ENCRYPTED BASELINE BACKUP

(75) Inventor: Vagish Kalligudd, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 968 days.

(21) Appl. No.: 12/112,736

(22) Filed: Apr. 30, 2008

(51) Int. Cl.
*G06F 12/14* (2006.01)
(52) U.S. Cl. ........ 713/193; 711/162; 380/255; 713/165; 713/182
(58) Field of Classification Search .......... 711/162; 380/255; 713/165, 182, 193
See application file for complete search history.

(56) References Cited

U.S. PATENT DOCUMENTS

| 5,659,614 A * | 8/1997 | Bailey, III | 713/165 |
| 2004/0083378 A1* | 4/2004 | LeRose | 713/193 |
| 2008/0022061 A1* | 1/2008 | Ito et al. | 711/162 |

OTHER PUBLICATIONS

Data center resilience assessment: Storage, networking and security by Mohamed, Yehia H. Khalil, Ph.D., University of Louisville, 2011, 127 pages; AAT 3491529.*
Migrating Enterprise Storage Applications to the Cloud by Vrable, Michael Daniel, Ph.D., University of California, San Diego, 2011, 113 pages; AAT 3460128.*

* cited by examiner

*Primary Examiner* — Thanhnga B Truong
*Assistant Examiner* — Angela Holmes
(74) *Attorney, Agent, or Firm* — Perkins Coie LLP

(57) ABSTRACT

An apparatus and method for securing a baseline backup are disclosed. As part of an incremental backup process, a selected set of file system data, including directories and files, are identified. The selected set of file system data are compressed, and then encrypted. Based on the encrypted and compressed file system data, a data digest is generated that uniquely identifies the encrypted and compressed file system data. The compressed and encrypted file system data are written to a portable storage device along with the data digest, thereby enabling the safe, manual transport of the file system data to a secondary, or backup, computer system (e.g., at a remote data center).

22 Claims, 6 Drawing Sheets

METHOD AND APPARATUS FOR GENERATING A COMPRESSED AND ENCRYPTED BASELINE BACKUP

FIELD OF THE INVENTION

The invention generally relates to backup techniques for data storage systems. More specifically, the invention relates to a method and apparatus for generating an encrypted and compressed baseline backup, which can be securely transferred from a primary computer system to a secondary, or backup, computer system.

BACKGROUND

Despite the overall improvement in the reliability of data storage devices (e.g., disk drives), it remains necessary to implement backup systems to protect against data loss. In a typical backup system, a backup agent executing on a primary or source computer system identifies and reads data to be backed up, and then automatically communicates (e.g., transmits over a network) a copy of the data to a secondary, or backup, computer system where the backup data are stored. Accordingly, if data loss occurs as a result of a failed data storage device at the primary computer system, the data can be restored by copying data from the secondary system back to a new data storage device at the primary system.

To minimize the amount of storage space required at the secondary computer system for storing backup data, many data backup systems utilize some form of incremental backup scheme. An incremental backup scheme is one where the backup agent executing at the primary computer system first generates an initial backup, often referred to as a baseline backup. A baseline backup includes all of the directories and/or files of a file system that a user has selected to be backed up. Accordingly, the backup agent on the primary computer system locates all of the directories and/or files designated as requiring backup, and then transfers a copy of those directories and/or files to a secondary computer system to be stored. Then, subsequent to the baseline backup being generated, the backup agent will periodically perform incremental backups. During each incremental backup, the backup agent locates and includes in a backup only those files (or blocks) that have changed since a previous backup was performed. Incremental backups may be performed at a file level, where an entire file is included in an incremental backup, or at the block level, where only the particular changed blocks of a file that has changed are included in the incremental backup.

It is often the case that the primary computer system, which is generating and/or storing the application data to be backed up, is located at a different location than the secondary computer system, where the backed-up data are stored. Accordingly, if a catastrophic event occurs at the location of the primary computer system, the secondary computer system—at a different location—would not be affected. Typically, the two computer systems will be communicatively coupled to one another by means of a network, such that the backup agent on the primary computer system sends the backup data over the network to the secondary computer system.

Because the initial baseline backup includes all directories and/or files from one or more volumes selected for backup, the amount of data to be transferred in a baseline backup can be very large, and almost certainly larger than any individual incremental backup. When the network connection between the primary and secondary computer systems is unable to quickly communicate large amounts of data (due to either bandwidth or throughput constraints), the transfer of the baseline backup data from the primary computer system to the secondary computer system may be delayed, or alternatively, it may interfere with the normal operation of the network. Consequently, in certain situations it may be more efficient to utilize an alternative transport mechanism for transporting the baseline backup data to the location of the secondary computer system (e.g., a data center). For example, the baseline backup may be written to a portable storage device, which is manually transported to the secondary computer system. However, a problem with this approach is that confidential and sensitive data may be compromised if the portable storage device should fall into the wrong hands.

SUMMARY

The present invention provides a method and apparatus for securing a selected set of directories and/or files written to a portable storage device, thereby enabling their safe, manual transport to a backup computer system. After an administrator or user has selected a set of directories and/or files to be included in a backup, a baseline backup operation is initiated to write the selected directories and/or files to a portable storage device. However, prior to writing the directories and/or files to the portable storage device, compression and encryption algorithms are performed to compress and encrypt the selected data. The compression and encryption algorithms are performed in a manner that is independent of the operating system of the computer system performing the compression and encryption routines. Consequently, the operating system of the backup computer system that performs the decryption and expansion routines need not be the same as that of the computer system that originally performed the encryption and compressions routines. After compressing and encrypting the data, a data digest that uniquely identifies the encrypted and compressed data is generated. Finally, the encrypted and compressed data, along with the data digest, are written to the portable storage device, which can be safely transported to a backup computer system. The data digest is used at the backup computer system to authenticate the encrypted and compressed data prior to decrypting, expanding and writing the data to storage devices of the backup system.

Other aspects of the invention will become apparent from the description that follows.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

Figure 1:
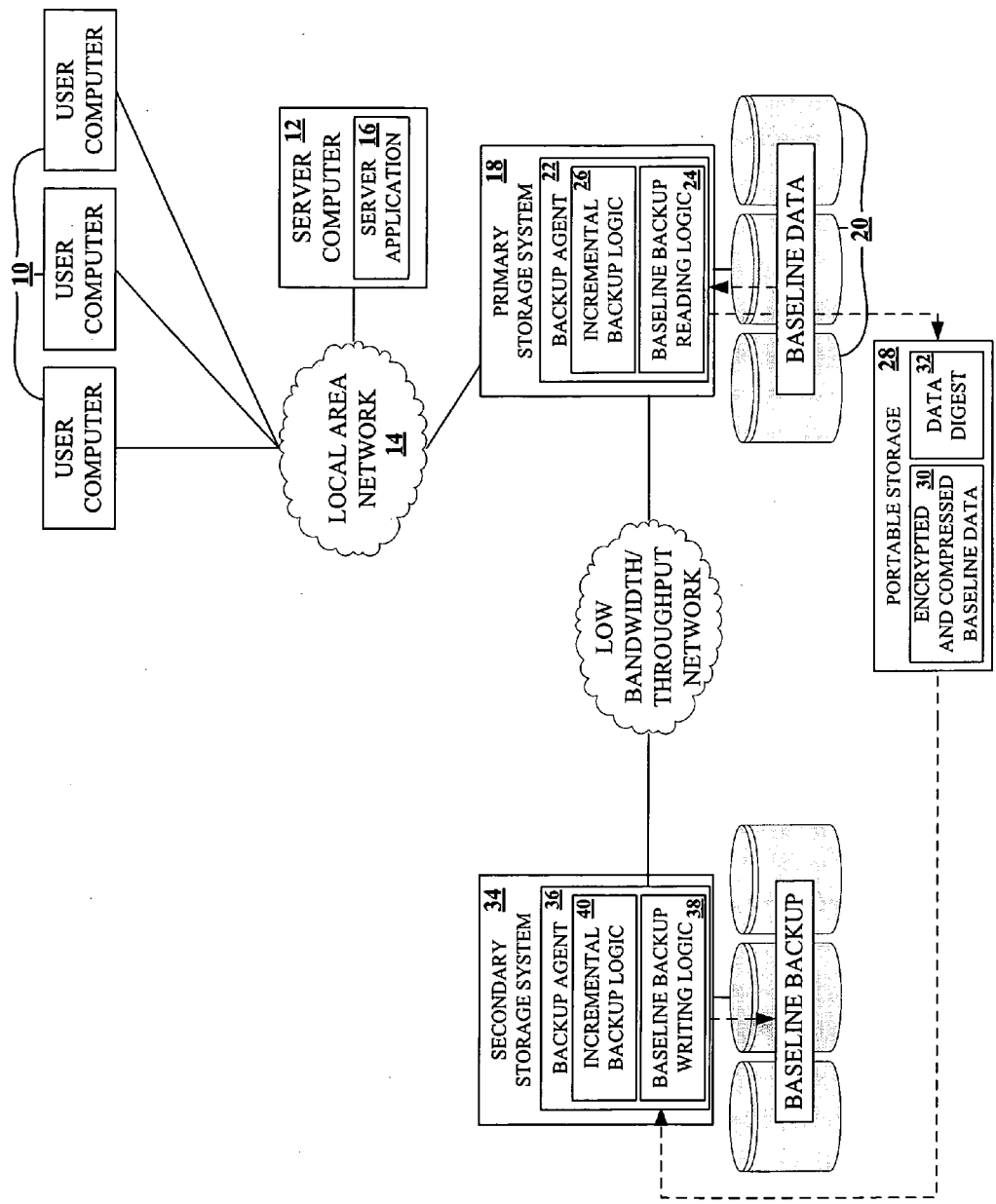
FIG. 1 illustrates a network environment in which a backup technique, according to an embodiment of the invention, may be deployed.

A method and apparatus for securing a baseline backup written to a portable storage device are disclosed. According to one embodiment of the invention, a selected set of directories and/or files (e.g., baseline backup) are compressed and encrypted prior to being written to a portable storage device, thereby allowing for the safe manual transport of the secured baseline backup from a primary computer system to a secondary, or backup, computer system. According to one aspect of the technique, a compression algorithm is used to compress the selected set of file system data that are to be included in the baseline backup. Next, the compressed baseline backup is encrypted. Advantageously, the compression and the encryption are performed in a manner that is independent of the computer platform performing the compression and encryption. For instance, if the encryption process is being performed by a computer system executing a version of a Microsoft® Windows operating system, the resulting encrypted baseline backup can be decrypted by a secondary computer executing an operating system other than Windows, such as a version of the UNIX® operating system.

In yet another aspect of the invention, after the baseline backup has been compressed and encrypted, a data digest is generated. The data digest and the encrypted and compressed baseline backup are written to a portable storage device, which can be easily and securely, manually transported to the secondary, or backup, computer system. Once the portable storage device is communicatively coupled to the secondary computer system, the data digest is used by the secondary computer system to authenticate the baseline backup and ensure that it is original and has not been tampered with or otherwise modified. For instance, to authenticate the baseline backup, at the secondary computer system a data digest is generated based on the encrypted and compressed baseline backup. If the data digest generated at the secondary computer system is equivalent to the data digest read from the portable storage device, the baseline backup is determined to be authentic. Once its authenticity is established, the encrypted and compressed baseline backup is decrypted and expanded before it is written to one or more storage devices of the secondary, or backup, computer system. Subsequent to writing the decrypted and expanded baseline backup to the storage devices of the secondary computer system, the secondary computer system may periodically receive one or more incremental backups over a network connection from the primary computer system. Accordingly, the baseline backup—communicated to the backup computer via the portable storage device—and one or more incremental backups—communicated to the backup computer over a network—can be used to restore files, directories or entire volumes, if necessary.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated herein. Hence, the reader should regard these illustrations merely as examples of embodiments of the present invention, the full scope of which is measured only in terms of the claims following this description.

As used herein, the terms "primary" and "secondary" are used to differentiate systems representing a source of data that is in need of backing up, and systems at which data are backed up or archived. For instance, a "primary" computer or storage system is one that receives and initially stores application and user data, and is therefore a source of data for purposes of a backup application. A secondary computer or storage system is one where copies of the application and user data are stored for backup purposes. Furthermore, it will be appreciated that the backup agents and applications described herein are independent of any particular type of computer platform. Specifically, the backup agents and applications may reside and execute on general-purpose computers having general-purpose operating systems, or alternatively, computer systems that are specifically designed to provide data storage services (referred to herein as storage systems), which may execute a storage-centric operating system.

FIG. 1 illustrates a network environment in which a backup technique, according to an embodiment of the invention, may be implemented. As illustrated in FIG. 1, several user computers 10 are coupled to a server computer 12 by means of a local area network (LAN) 14. The user computers 10 represent conventional personal computing systems, such as desktop, workstation, laptop or notebook computers. The server computer 12 may be executing any of a variety of operating systems, including a version of Microsoft® Windows or UNIX. As illustrated in FIG. 1, the server computer 12 is shown executing a server application 16. The server application 16 may be any of a wide variety of server applications to include, Microsoft® Exchange or SQL server, or Oracle® Database.

As illustrated in FIG. 1, the user computers 10 and the server computer 12 are communicatively coupled by means of the LAN 14 to a primary storage system 18, which provides a highly-available data storage service. Accordingly, application data generated at the user computers 10 and/or the server application 16 are stored on the storage devices 20 of the primary storage system 18. The primary storage system 18 may be a network-attached storage (NAS) system. Alternatively, the primary storage system 18 may be configured to operate in a storage area network (SAN) environment. The primary storage system 18 may have its own proprietary, storage-centric operating system. For instance, in one embodiment of the invention, the primary storage system 18 may execute a version of the Data ONTAP® operating system developed by NetApp, Inc. of Sunnyvale, Calif.

The primary storage system 18 includes a backup agent 22 having baseline backup reading logic 24 and incremental backup logic 26. In general, the backup agent 22 facilitates the backup operations for enabling an incremental backup procedure to be performed. The incremental backup procedure provides a mechanism by which data stored on the storage devices of the primary storage system 18 can be backed up to storage devices of the secondary storage system 34. As the names suggest, the baseline backup reading logic 24 facilitates the generation of a baseline backup, whereas the incremental backup logic 26 facilitates the periodic transfer of incremental backups to the secondary storage system 34.

According to an embodiment of the invention, the baseline backup reading logic 24 generates a secure baseline backup and writes the secure baseline backup to a portable storage device 28. In particular, and as described in greater detail below, the baseline backup reading logic 24 reads a selected set of data including directories and files (e.g., baseline data), which are to be included in the baseline backup, from one or more volumes of a file system. To increase the amount of data that can be stored on the portable storage device 28, the reading logic 24 compresses the selected data. Next, the reading logic 24 encrypts the data. After compressing and encrypting the selected data to derive an encrypted and compressed baseline backup 30, the reading logic 24 generates a data digest 32 uniquely identifying the encrypted and compressed baseline backup 30. Finally, the backup agent 22 writes the encrypted and compressed baseline data 30, as well as the data digest 32, to the portable storage device 28.

The portable storage device 28 may be any storage device suitable for storing and manually transporting a baseline backup. For example, the portable storage device may be an optical disk, a magnetic disk, a solid state device, such as a flash memory device, or any other suitable storage device. In one embodiment of the invention, the reading logic 24, or another component of the primary storage system 18, may include logic to prevent data from being written to the portable storage device 28 unless such data has been encrypted. This may be accomplished in a number of ways. For instance, the logic for writing data to the portable storage device may verify that the data being written has been encrypted. Alternatively, the logic for writing data to the portable storage device may only receive data from the encryption algorithm, thereby ensuring that any data that it receives and is ultimately written to the portable storage device is encrypted data. However implemented, this prevents the unintentional copying of unencrypted data to the portable storage device 28.

After the data digest 32 and the encrypted and compressed baseline backup 30 have been written to the portable storage device 28, the portable storage device 28 may be manually transported to the secondary storage system 34. For instance, if the secondary storage system 34 resides at an offsite data center, the portable storage device 28 may be manually transported to the data center. The portable storage device 28 is then communicatively coupled to the secondary storage system 34 in a manner supported by the particular type of portable storage device 28. For example, if the portable storage device 28 is an optical disk, it may be inserted into an optical disk drive. Similarly, if the portable storage device is a magnetic disk or a solid-state disk, it may be coupled to the secondary storage system by means of an appropriate interface port or cable (e.g., a Universal Serial Bus (USB) or other suitable cable). In any case, after the portable storage device 28 has been communicatively coupled to the secondary storage system 34, the baseline backup writing logic 38 of the backup agent 36 executing on the secondary storage system 24 will authenticate, decrypt, and expand the baseline backup prior to writing the baseline backup to one or more storage devices.

The particular network environment illustrated in FIG. 1 is representative of the type of network environment in which a backup technique consistent with the invention may be used. It will be appreciated that the environment shown in FIG. 1 is provided as one example. In an alternative network environment, multiple server applications and/or multiple server computers may utilize the storage services of the primary storage system 18. Furthermore, in one embodiment of the invention, the storage devices 20 may be coupled to multiple storage systems configured to operate in a cluster. In such an environment, the backup agent 22 may reside on any one of the storage systems.

Figure 2:
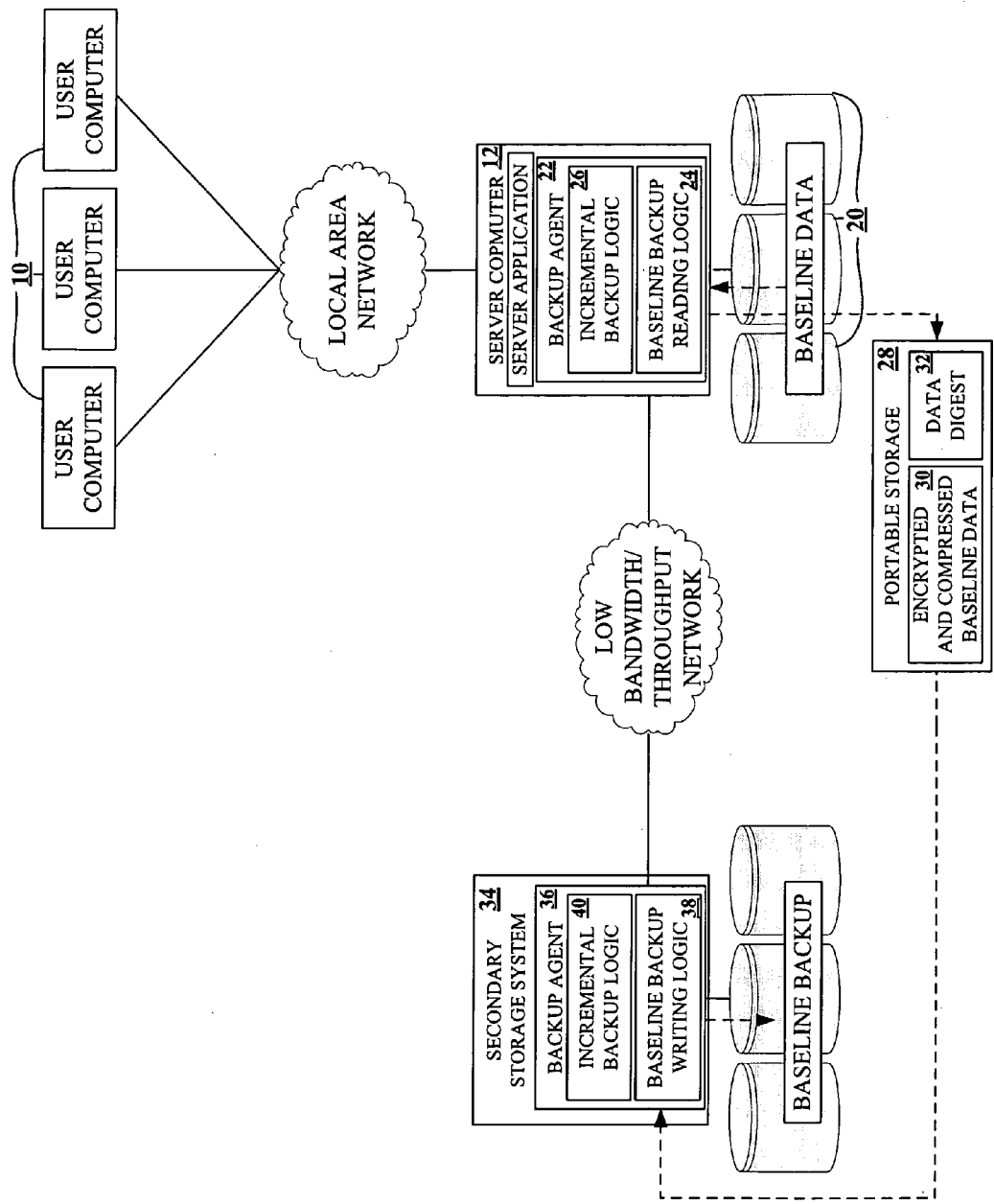
FIG. 2 illustrates an alternative network environment in which a backup technique, according to embodiment of the invention, may be deployed.

FIG. 2 illustrates an alternative network environment in which a backup technique, according to embodiment of the invention, may be deployed. The primary difference between the environments of FIG. 1 and FIG. 2 is that in FIG. 1, the backup agent 22 that generates the secure baseline backup resides on, and is executed by, a primary storage system 18, whereas in FIG. 2, the backup agent 22 resides on, and is executed by, a server computer 12. As such, it will be appreciated that the invention is independent of any particular computer or storage system, and may reside on a server executing server applications.

Figure 3:
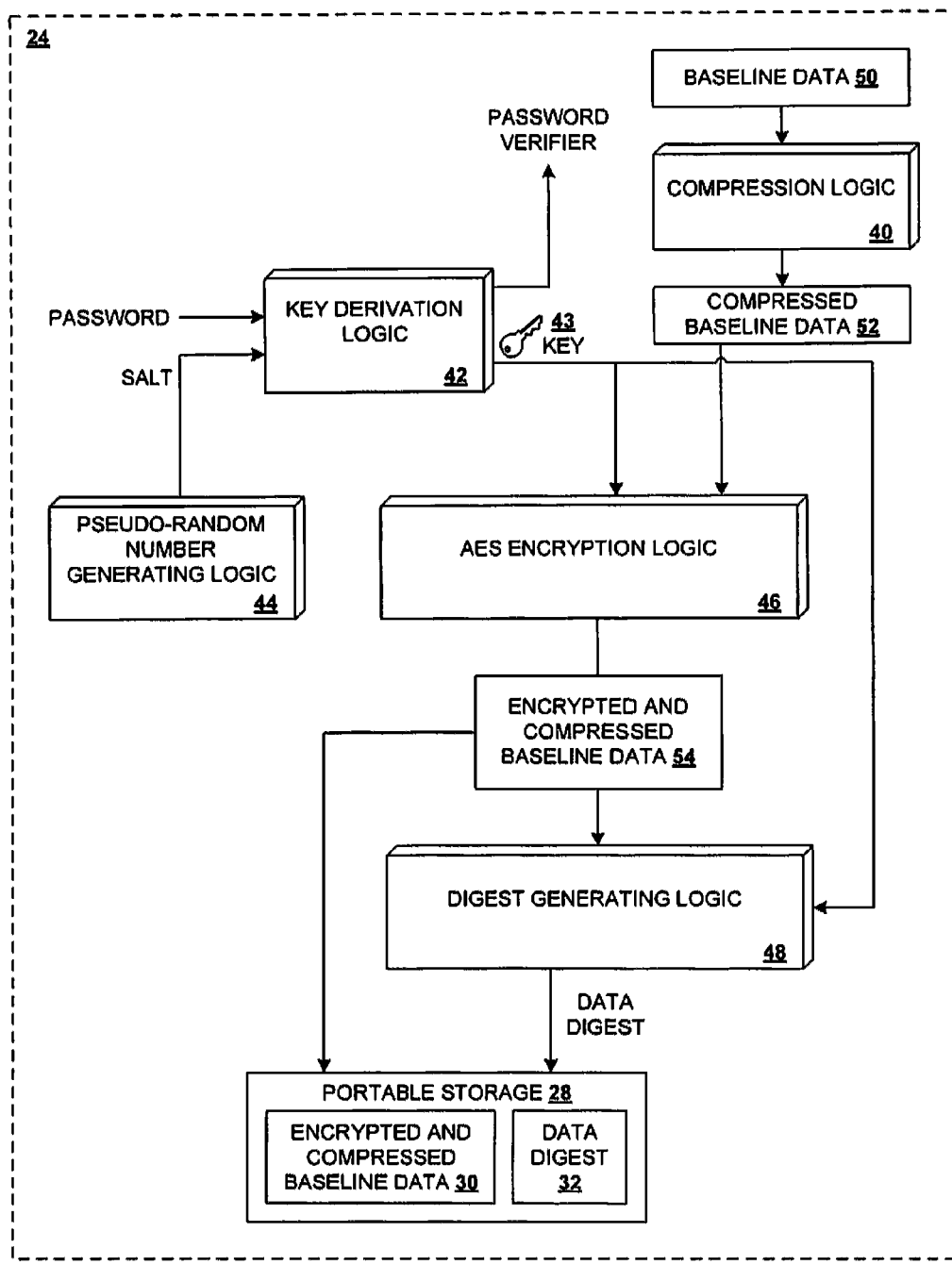
FIG. 3 illustrates a logical block diagram of a portion of a backup application representing the baseline backup reading logic for securing a baseline backup, according to an embodiment of the invention.

FIG. 3 illustrates a logical block diagram of that portion of a backup agent representing the baseline backup reading logic 22 for securing a baseline backup, according to an embodiment of the invention. As illustrated in FIG. 3, the baseline backup reading logic 24 includes compression logic 40, key derivation logic 42, pseudo-random number generating logic 44, encryption logic 46, and digest generating logic 48.

In general, an administrator or user of the backup agent 22 will specify a set of directories and/or files from one or more volumes of a file system that are to be included in the baseline backup of an incremental backup procedure. Alternatively, the file system data to be backed up may be selected by automated means, for example, by a software application. When the incremental backup procedure is first initiated, an administrator or user will be prompted to provide a password or a secret passphrase. In one embodiment of the invention, the password or passphrase is first verified against a list of known passwords or passphrases, and if it checks out as valid, the compression logic 40 begins compressing the selected set of directories and/or files (e.g., baseline data 50). Any of the many well-known conventional compression algorithms may be utilized for this purpose. However, in one embodiment, the compression algorithm is independent of the underlying computer platform (e.g., operating system and processor type).

In addition to compressing the baseline data, the key derivation logic 42 utilizes the verified password or passphrase in generating a private key. For instance, as shown in FIG. 3, the password and a salt value (generated by pseudo-random number generating logic 44) serve as inputs to the key derivation logic 42. The salt value is a randomly (or pseudo-randomly) generated sequence of bytes of a particular length. For instance, depending upon the particular implementation, the salt value may be eight, twelve, sixteen, thirty-two, or some other number of bytes in length. In one embodiment of the invention, the key derivation function implemented by the key derivation logic 42 is consistent with some or all of the recommendations set forth in the Internet Engineering Task Force (IETF), Request for Comments (RFC) number 2898. Accordingly, depending upon the particular implementation, the private key derived by the key derivation logic 42 may be 128-, 192-, or 256-bits in length.

As indicated in FIG. 3, the private key 43 derived by the key derivation logic 42 is utilized by the encryption logic 46 to encrypt the compressed baseline data 52. In one embodiment of invention, the encryption logic 46 utilizes an encryption algorithm consistent with the well-known Advanced Encryption Standard (AES). After the compressed baseline data has been encrypted, the private key 43 is utilized by the digest generating logic 48 to derive a data digest 32 that uniquely identifies the encrypted and compressed baseline data 54. Although a wide variety of well-known data digest generating algorithms might be used, in one embodiment of the invention the particular algorithm is a Hash Message Authentication Code (HMAC) algorithm that is consistent with some or all of the recommendations set forth in the Internet Engineering Task Force (IETF), Request for Comments (RFC) number 2104. Similarly, a variety of secure hash algorithms (SHA's) may be consistent with the invention. In one particular embodiment of the invention, the secure hash algorithm designed by the National Security Agency and referred to as SHA-512 is utilized as the hash algorithm. In any case, by generating a data digest and writing the data digest to the portable storage device 28 with the encrypted and compressed baseline data 30, the encrypted and compressed baseline data 30 can be authenticated at the secondary storage system 34.

Figure 4:
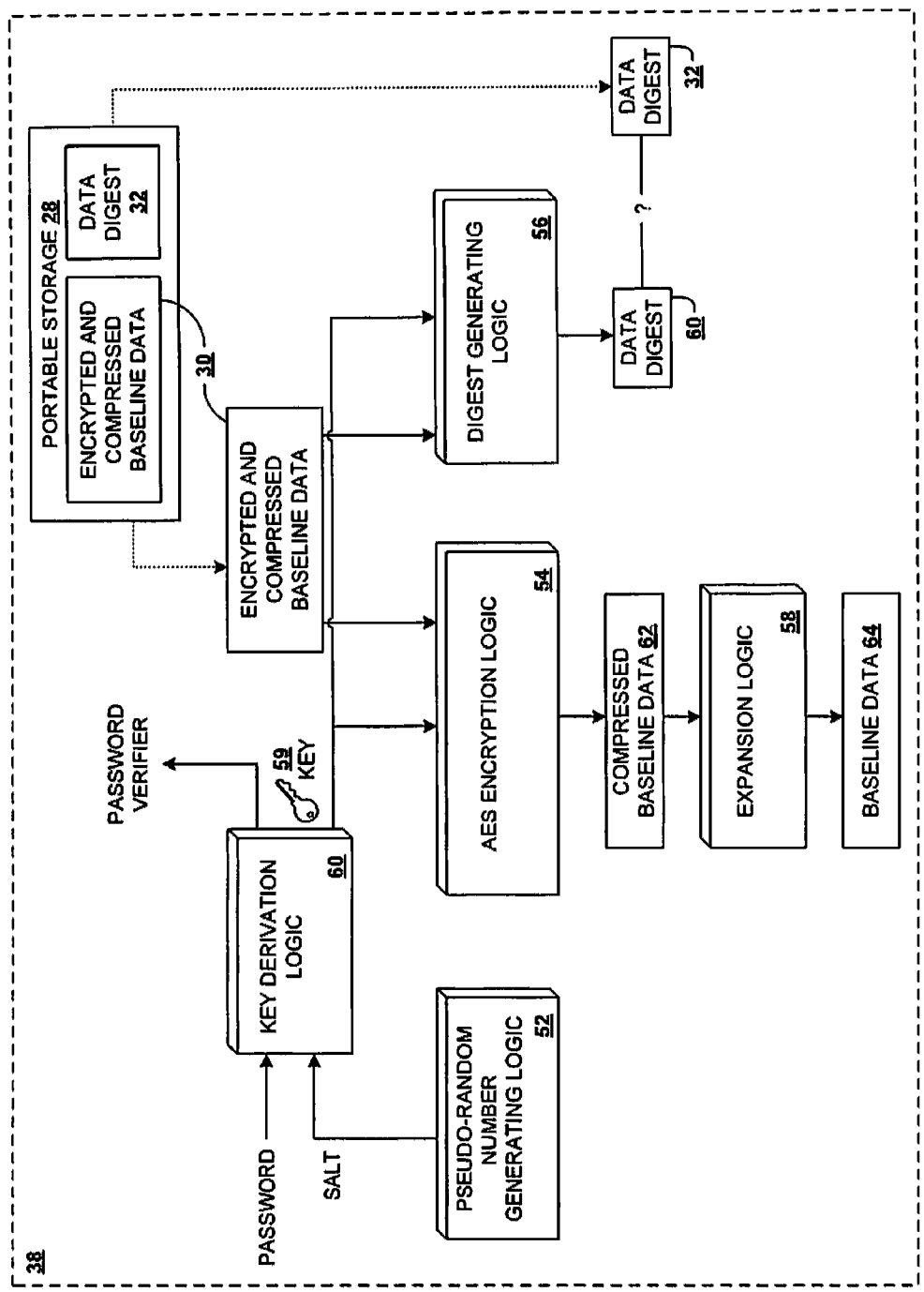
FIG. 4 illustrates a logical block diagram of a backup application for authenticating, decrypting and expanding a baseline backup that has previously been compressed and encrypted, according to an embodiment of the invention.

Turning now to FIG. 4, a logical block diagram of a portion of backup application for authenticating, decrypting and expanding a baseline backup that has previously been compressed and encrypted is shown. The portion of the backup application shown in FIG. 4 represents the baseline backup writing logic 38 (of FIG. 1) which serves to transfer the baseline backup from the portable storage device to the storage devices of the secondary computer system 34. Accordingly, the baseline backup writing logic 38 includes key derivation logic 50, pseudo-random number generating logic 52, decryption logic 54, digest generating logic 56, and expansion logic 58.

To initiate the process of writing the baseline data from the portable storage device 28 to the storage devices of the secondary storage system 34, the administrator or user is again prompted to provide a password or secret passphrase. For example, the administrator is prompted to provide the exact password or passphrase that was originally provided during the procedure to compress and encrypt the baseline data. If the password or passphrase checks out as being valid, the key derivation logic 52 derives a private key 59 based on the user-supplied password and a salt value generated by a pseudo-random number generating logic 52. As illustrated in FIG. 4, this private key 59 is used by the decryption logic 54—to decrypt the baseline data 30—and by the digest generating logic 56—to generate a data digest 60 for authenticating the baseline data 30.

In general, the decryption logic 54 implements a decryption algorithm to reverse the effects of the encryption algorithm used by the baseline backup reading logic 24 that encrypted the baseline data at the primary computer system 18. Accordingly, the decryption logic 54, in one embodiment of the invention, may be consistent with the AES algorithm.

The digest generating logic 56 of the baseline backup writing logic 38 of the secondary computer system 34 is essentially the same as that of the reading logic 24 at the primary system 18. Accordingly, the digest generating logic 56 attempts to authenticate the baseline data by generating a data digest 60 that is equivalent to the data digest 32 generated at the primary system 18. If the data digest generated at the secondary system is equivalent to the data digest read from the portable storage device 28, it is assumed that the baseline data is authentic.

After the baseline data has been decrypted, resulting in compressed baseline data 62, expansion logic 58 reverses the effect of the compression logic 40 and expands the baseline data to its original form. Finally, the baseline data 64 are written to one or more storage devices of the secondary computer system.

In contrast to many conventional compression and encryption techniques, an embodiment of the invention provides for compressing and encrypting the baseline data in a manner that is independent of the computer platforms that are performing the encryption/decryption and compression/expansion operations. In conventional methods, the compression and/or encryption algorithms are dependent upon underlying functions or attributes (e.g., keys) provided by the operating system of the computer. Advantageously, the encryption and compression algorithms of the invention are independent of any such factors. This allows data encrypted on a Windows® based system to be decrypted on a UNIX system, and so on.

Figure 5:
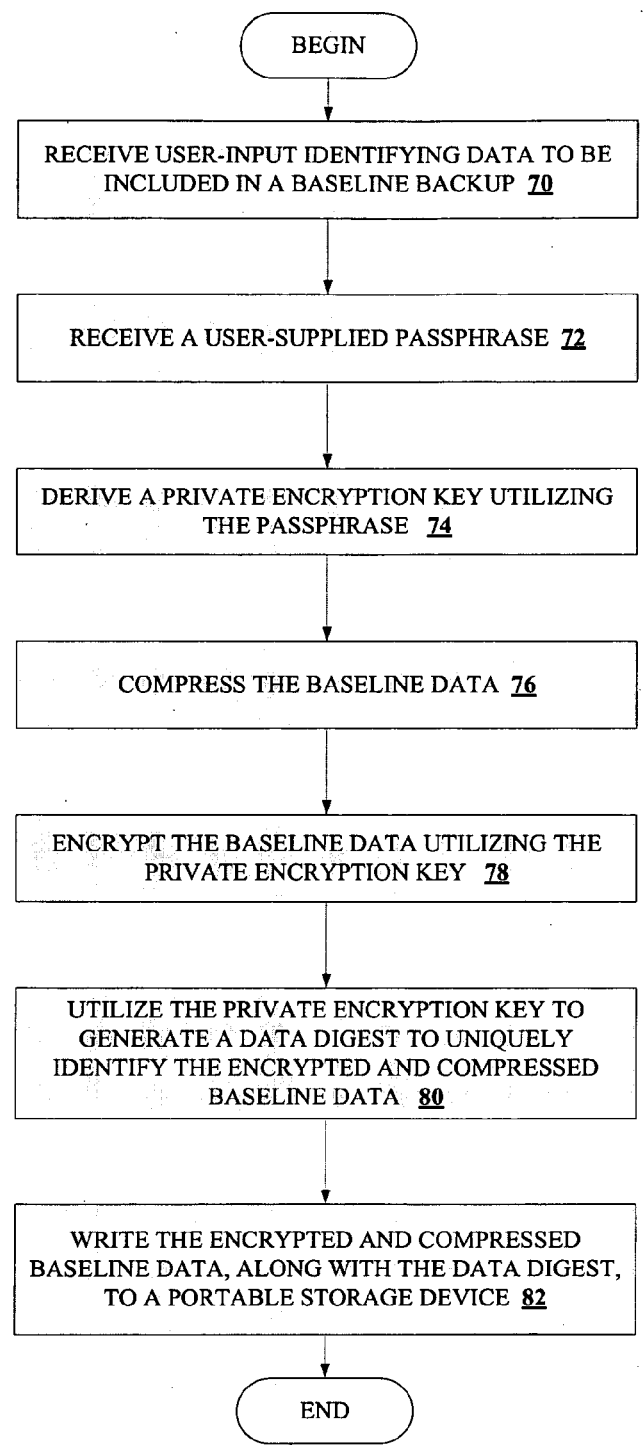
FIG. 5 illustrates a method, according to an embodiment of the invention, for securing a baseline backup.

FIG. 5 illustrates a method, according to an embodiment of the invention, for securing a baseline backup to be transported via a portable storage device to a secondary computer system. The method begins at operation 70 when user input is received indicating a selection of directories and/or files to be included in a baseline backup. The user input may be received via a graphical user interface of the backup application, or alternatively, the user-input may be received from a backup management application executing on a host system that is remote from the backup agent that performs the backup procedure. In an alternative embodiment of the invention, the selection of file system data to be included in a backup may be made by automated means, for example, such as by another software application.

Next, at method operation 72, the incremental backup procedure is initiated when the backup agent prompts for, and receives, a user-supplied password or passphrase. In one embodiment of the invention, the password or passphrase is verified, for example, by comparing it to a list of known valid password or passphrases. If the password or passphrase checks out as valid, at method operation 74 the key derivation logic utilize the password or passphrase, along with a salt value generated by a pseudo-random number generating logic, to derive a private encryption key.

At method operation 76, the selected directories and/or files are compressed, resulting in a compressed baseline backup. Then, at method operation 78, the private encryption key is used to encrypt the compressed baseline backup.

At method operation 80, the private encryption key and the encrypted and compressed baseline backup are utilized as inputs to a data digest generating logic. The data digest generating logic generates a data digest that uniquely identifies the encrypted and compressed baseline backup. Accordingly, the data digest can be used at the secondary computer system to verify the authenticity of the encrypted and compressed baseline backup, prior to writing the backup to the storage devices of the secondary computer system. Finally, at method operation 82, the encrypted and compressed baseline backup and the data digest are written to a portable storage device. The portable storage device can safely be used to transport the baseline backup to a data center. If the portable storage device is mishandled or stolen, its contents are secure and cannot be decrypted without knowledge of the secret password or passphrase used to encrypt the backup.

Figure 6:
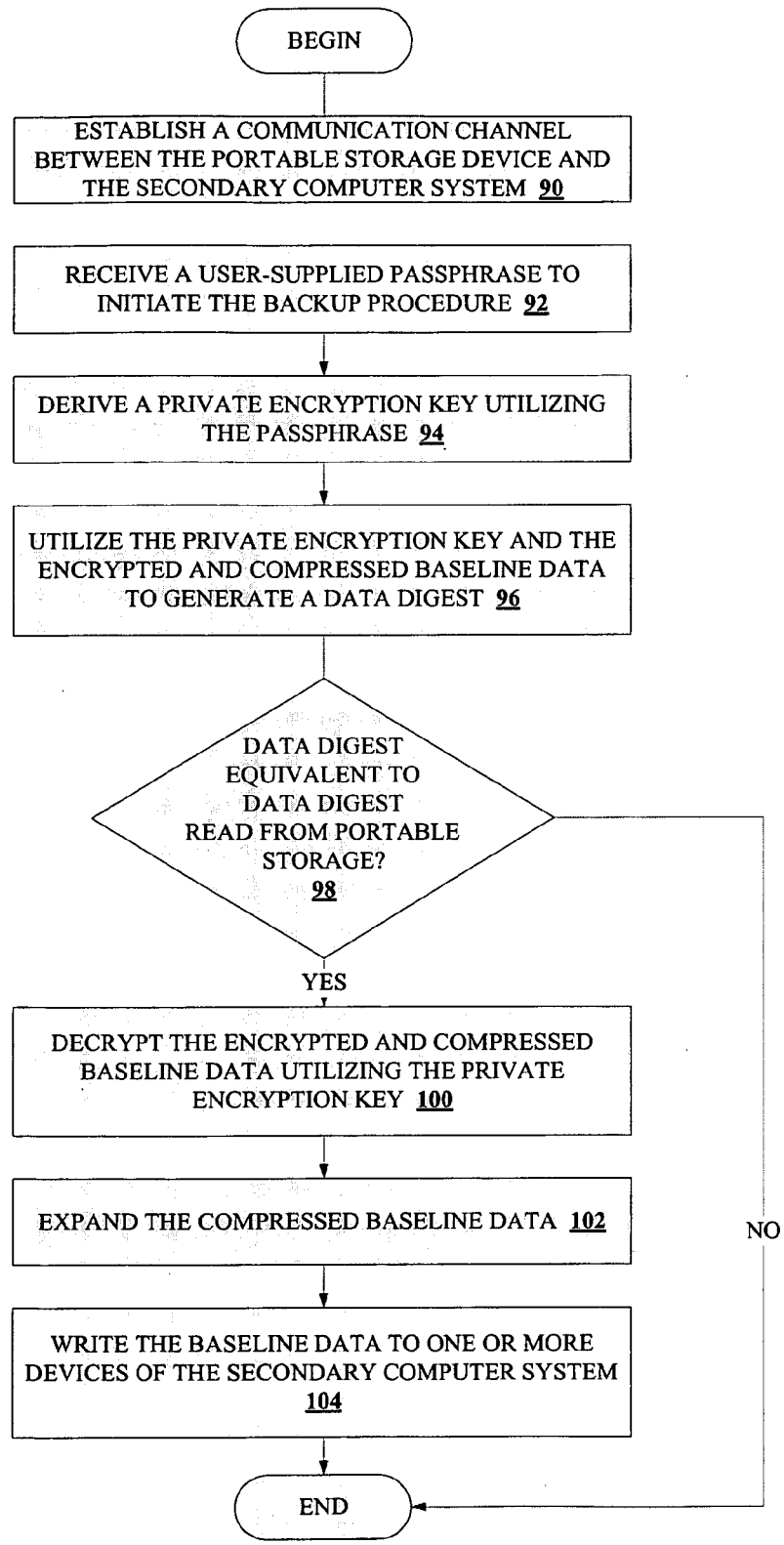
FIG. 6 illustrates a method, according to an embodiment of the invention, for authenticating, decrypting and expanding a baseline backup.

FIG. 6 illustrates a method, according to an embodiment of the invention, for authenticating, decrypting and expanding a baseline backup stored on a portable storage device. As illustrated in FIG. 6, the method begins at operation 90 when the portable storage device is attached, or otherwise enabled, to communicate with the secondary computer system. For instance, depending upon the exact nature of the portable storage device, the manner of establishing a communication channel with the secondary computer system may vary. If, for example, the portable storage device is an optical disk, it may simply be inserted into an optical disk drive. However, if the portable storage device is a portable magnetic disk drive, the disk drive may be coupled to the secondary computer system with a cable. Alternatively, the portable storage device may have means for wirelessly communicating with the secondary computer system, in which case suitable steps may be taken to configure the communication of data between the portable storage device and the secondary computer system.

Once communication is established between the portable storage device and the secondary computer system, at method operation 92 a backup agent or application executing on the secondary computer system prompts for and receives a user-supplied password or passphrase. Next, at method operation

94, the secret password or passphrase is utilized to derive a private encryption (or decryption) key. The private key is used at method operation 96 to generate a data digest. For example, utilizing as inputs the private encryption key and the encrypted and compressed baseline backup, data digest generating logic derives a data digest.

At method operation 98, the data digest generated by the secondary computer system is compared with the data digest read from the portable storage device. If the two data digests are equivalent, it is assumed that the encrypted and compressed baseline backup has not been tampered with and is indeed authentic. Consequently, at method operation 100, the private key (generated at method operation 94) is used to decrypt the encrypted and compressed baseline backup. Next, at method operation 102, the compressed baseline data is expanded. Finally, at method operation 104, the baseline backup is written to one or more storage devices of the secondary computer system.

Once the baseline backup has been written to one or more storage devices of the secondary computer system, the primary computer system may periodically send the secondary computer system an incremental backup—for example, a subset of the selected file system data representing those files or data blocks that have changed since the most recent previous backup operation completed. For instance, depending upon whether the incremental backup is file-based or block-based, the incremental backup may include portions of data representing the file-level or block-level changes made to one or more directories or files included in the original baseline backup. As these incremental backups are smaller in size, communicating them over a network should not have any adverse affects to the operation of the network, and should be completed in a timely manner. Generally, the incremental backups will occur periodically according to some predefined schedule. For instance, an administrator or user may set the schedule so that incremental backups occur on an hourly, daily, or weekly basis, or based on some customized time period. Alternatively, the incremental backups may be scheduled to occur based on an analysis of the amount of data that has changed since a previous backup occurred. For instance, an incremental backup may be scheduled to occur after a certain number of files or data blocks have been changed since the last backup was completed. If necessary, a file, directory or volume can be restored to the primary computer system by copying the appropriate portions of the baseline backup and/or an incremental backup from the secondary computer system to the primary computer system.

The method operations illustrated and described herein are meant to serve as examples. In various embodiments of the invention, the particular order of the method operations may vary from what is described herein. In particular, certain operations may be performed in parallel, and in some cases, in an order different from what is shown in the examples presented herein. As an example, depending upon the particular implementation, to initiate a backup operation a password or passphrase may be entered prior to, or after, a user has selected a set of files and/or directories for the backup.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. In general, the scope of the invention is defined by the claims and their equivalents.

What is claimed is:

1. A computer-implemented method, comprising:
   at a first computer system, compressing and encrypting file system data in a manner that is independent of an operating system of the first computer system so as to enable a second computer system having an operating system that differs from that of the first computer system to decrypt and expand the file system data, wherein the file system data represents a baseline backup for an incremental backup procedure;
   at the first computer system, generating a data digest that uniquely identifies the compressed and encrypted file system data;
   at the first computer system, writing the compressed and encrypted file system data, along with the data digest, to a portable storage device to facilitate secure manual transportation of the file system data to the second computer system;
   subsequent to writing the compressed and encrypted file system data to the portable storage device, monitoring the file system data at the first computer system to determine if changes are made to the file system data; and
   periodically communicating a subset of the file system data over a network to the second computer system, wherein the subset of the file system data represents those portions of the file system data that have changed since a previous backup operation.

2. The computer-implemented method of claim 1, wherein encrypting the file system data at the first computer system includes generating a private encryption key derived from a user-supplied password and a salt value generated by a pseudo-random number generator, and utilizing the private encryption key to perform the encrypting.

3. The computer-implemented method of claim 1, further comprising: preventing the file system data from being written to a portable storage device unless the file system data has been encrypted.

4. The computer-implemented method of claim 2, wherein the data digest is generated with a cryptographic hash function utilizing the private encryption key and the compressed and encrypted file system data as input to the cryptographic hash function.

5. The computer-implemented method of claim 1, wherein the baseline backup represents a complete copy of a selected set of file system data, including directories and/or files.

6. The computer-implemented method of claim 5, wherein the selected set of file system data is manually selected by a user or administrator.

7. The computer-implemented method of claim 5, wherein the selected set of file system data is automatically selected by a software application.

8. A computer-implemented method, comprising;
   at a storage system, reading from a portable storage device a data digest for authenticating an encrypted and compressed baseline backup of file system data stored on the portable storage device, and authenticating the encrypted and compressed baseline backup of the file system data by comparing the data digest read from the portable storage device with a data digest derived from the encrypted and compressed baseline backup of the file system data and a private encryption key, the private encryption key derived from a user-supplied password and a salt value generated, at the storage system, by a pseudo-random number generator;
   if the encrypted and compressed baseline backup proves authentic, decrypting the encrypted and compressed baseline backup of the file system utilizing the private encryption key derived from the user-supplied password and the salt value generated, at the storage system, by the pseudo-random number generator, and expanding the resulting decrypted and compressed baseline backup of the file system;

writing to one or more storage devices of the storage system the decrypted and expanded baseline backup of the file system; and subsequent to writing the decrypted and expanded baseline backup of the file system to the one or more storage devices, receiving a subset of the file system data at the storage system, wherein the subset of the file system data represents those portions of the file system data that have changed since a previous backup operation.

9. The computer-implemented method of claim 8, wherein the encrypted and compressed baseline backup of the file system stored on the portable storage device includes a copy of the selection of directories, files and/or volumes that have been compressed and encrypted at a source computer system with compression and encryption algorithms that are independent of any operating system executing at the source computer system, thereby permitting the compressed and encrypted baseline backup of the file system to be decrypted and expanded at a computer system having an operating system that differs from that of the source computer system.

10. The computer-implemented method of claim 9, wherein decrypting the encrypted and compressed baseline backup of the file system includes utilizing a decryption algorithm consistent with the Advanced Encryption Standard (AES) encryption algorithm, and the private encryption key derived from the user-supplied password and the salt value is a 128-, 192- or 256-bit private encryption key.

11. The computer-implemented method of claim 9, wherein the data digest, derived from the encrypted and compressed baseline backup of the file system and the private encryption key, is generated with a cryptographic hash function consistent with HMAC-SHA-512.

12. A computer-implemented method, comprising:
compressing and encrypting a selection of directories and/or files at a first computer system to derive a compressed and encrypted baseline backup of a file system, wherein
i) the encrypting is performed with a private encryption key derived from a user-supplied password and a salt value generated by a pseudo-random number generator, and ii) the compressing and encrypting are performed in a manner that is independent of an operating system of the first computer system, permitting the compressed and encrypted baseline backup of the file system to be decrypted and expanded by a second computer system having an operating system that differs from the operating system of the first computer system;

generating a data digest at the first computer system by utilizing as input the private encryption key and the compressed and encrypted baseline backup;

at the first computer system, writing the compressed and encrypted baseline backup, along with the data digest, to a portable storage device; and subsequent to writing the compressed and encrypted baseline backup to the portable storage device, monitoring the selection of directories and/or files at the first computer system to determine if changes are made; and periodically communicating a subset of the selection of directories and/or files over a network to the second computer system, wherein the subset of the selection of directories and/or files represents those portions of the selection of directories and/or files that have changed since a previous backup operation.

13. The computer-implemented method of claim 12, wherein encrypting the selection of compressed directories and/or files to derive a compressed and encrypted baseline backup of a file system includes utilizing an encryption algorithm consistent with the Advanced Encryption Standard (AES) encryption algorithm, and the private encryption key derived from the user-supplied password and the salt value is a 128-, 192- or 256-bit private encryption key.

14. The computer-implemented method of claim 12, further comprising:
prior to encrypting the selection of compressed directories and/or files, receiving user input indicating the particular directories and/or files to be included in the baseline backup of the file system.

15. The computer-implemented method of claim 12, wherein generating a data digest at the first computer system by utilizing as input the private encryption key and the compressed and encrypted baseline backup includes generating the data digest with a cryptographic hash function consistent with the HMAC-SHA-512 algorithm.

16. An apparatus comprising:
a processor;
compression logic accessible to the processor and configured to generate a compressed copy of directories and/or files of a file system representing a baseline backup for an incremental backup procedure;
key derivation logic configured to derive a private encryption key from inputs including a user-supplied password and a salt value generated from a pseudo-random number generator;
encryption logic configured to utilize the private encryption key to encrypt the compressed copy of directories and/or files of the file system in a manner that is independent of any computer platform on which the compression logic and encryption logic reside and execute;
digest generating logic to generate a data digest uniquely identifying the encrypted and compressed copy of directories and/or files of the file system;
logic configured to write the data digest and the encrypted and compressed copy of directories and/or files of the file system to a portable storage device; and
incremental backup logic configured to monitor the directories and/or files for changes and to periodically communicate the changes to a second computer system over a network.

17. A computer system, comprising:
a processor;
baseline backup writing logic accessible to the processor and configured to i) read from a portable storage device a data digest for authenticating an encrypted and compressed baseline backup of a file system stored on the portable storage device, ii) authenticate the encrypted and compressed baseline backup of the file system by comparing the data digest read from the portable storage device with a data digest derived from the encrypted and compressed baseline backup of the file system and a private encryption key, the private encryption key derived from a user-supplied password and a salt value generated, at the storage system, by a pseudo-random number generator, and if the encrypted and compressed baseline backup proves authentic, iii) decrypt the encrypted and compressed baseline backup of the file system by utilizing the private encryption key derived from the user-supplied password and the salt value generated, at the storage system, by the pseudo-random number generator, iv) expand the resulting decrypted and compressed baseline backup of the file system, and v) write to one or more storage devices of the storage system the decrypted and expanded baseline backup of the file system; and incremental backup logic configured to monitor the file system for changes and to periodically communicate the changes to the storage system over a network.

18. The computer system of claim 17, wherein the decrypted and expanded baseline backup of the file system includes a copy of a selection of directories, files and/or volumes from a source computer system.

19. The computer system of claim 17, wherein the encrypted and compressed baseline backup of the file system stored on the portable storage device includes a selection of directories, files and/or volumes that have been compressed and encrypted at a source computer system with compression and encryption algorithms that are independent of any operating system executing at the source computer system, thereby permitting the compressed and encrypted baseline backup of the file system to be decrypted and expanded at a computer system having an operating system that differs from that of the source computer system.

20. The computer system of claim 17, wherein decrypting the encrypted and compressed baseline backup of the file system includes utilizing a decryption algorithm consistent with the Advanced Encryption Standard (AES) encryption algorithm, and the private encryption key derived from the user-supplied password and the salt value is a 128-, 192- or 256-bit private encryption key.

21. The computer system of claim 17, wherein the data digest, derived from the encrypted and compressed baseline backup of the file system and the private encryption key, is generated with a cryptographic hash function consistent with HMAC-SHA-512.

22. A system comprising:

a first computer system including baseline backup reading logic configured to i) generate an encrypted and compressed baseline backup of a file system by utilizing encryption and compression algorithms that are independent of the operating system executing at the first computer system, ii) generate a data digest based, in part, on the encrypted and compressed baseline backup of the file system, and iii) write the encrypted and compressed baseline backup of the file system, along with the data digest, to a portable storage device;

the first computer system also including incremental backup logic configured to monitor the file system for changes and to periodically communicate the changes over a network; and a second computer system including baseline backup writing logic configured to i) authenticate the encrypted and compressed baseline backup of the file system, ii) decrypt and expand the baseline backup of the file system, if authenticated, iii) write the baseline backup of the file system to one or more storage devices; and iv) write the changes received over the network that occurred since the baseline backup of the file system.

* * * * *